(12) United States Patent
Edvardsson et al.

(10) Patent No.: US 8,872,695 B2
(45) Date of Patent: Oct. 28, 2014

(54) GUIDED WAVE RADAR LEVEL GAUGE SYSTEM WITH DIELECTRIC CONSTANT COMPENSATION THROUGH MULTI-MODE PROPAGATION

(75) Inventors: Olov Edvardsson, Linköping (SE); Alexander Dahl, Mölndal (SE)

(73) Assignee: Rosemount Tank Radar AB, Gothenburg (SE)

(*) Notice: Subject to any disclaimer, the term of this patent is extended or adjusted under 35 U.S.C. 154(b) by 667 days.

(21) Appl. No.: 13/159,544

(22) Filed: Jun. 14, 2011

(65) Prior Publication Data
US 2012/0319891 A1 Dec. 20, 2012

(51) Int. Cl.
G01S 13/08 (2006.01)
H01Q 1/22 (2006.01)
G01F 23/284 (2006.01)

(52) U.S. Cl.
CPC .............. G01F 23/284 (2013.01); H01Q 1/225 (2013.01)
USPC ........................................................ 342/124

(58) Field of Classification Search
CPC .............. G01F 23/284; G01F 23/2962; G01F 25/0061; G01F 23/00; G01F 23/28; G01F 23/24; G01F 23/26; G01F 22/00; H01Q 1/225; G01S 13/88; G01S 13/08; G01S 13/103; G01S 13/42; G01S 15/08
USPC .......................................... 342/118, 124, 175
See application file for complete search history.

(56) References Cited

U.S. PATENT DOCUMENTS

| | | | | |
|---|---|---|---|---|
| 4,489,601 A | * | 12/1984 | Rao et al. ........................ | 73/290 R |
| 4,729,245 A | * | 3/1988 | Hansman, Jr. .................. | 73/865 |
| 5,282,239 A | * | 1/1994 | Yokoi et al. .................... | 455/465 |
| 5,459,441 A | * | 10/1995 | Weber et al. ................... | 333/136 |
| 5,502,392 A | * | 3/1996 | Arjavalingam et al. ....... | 324/638 |
| 5,609,059 A | * | 3/1997 | McEwan ........................ | 73/290 R |
| 6,019,007 A | * | 2/2000 | Grieger et al. ................. | 73/866.5 |
| 6,184,818 B1 | * | 2/2001 | Meinel ........................... | 342/124 |
| 6,202,485 B1 | * | 3/2001 | Wien et al. ..................... | 73/290 R |
| 6,415,660 B1 | * | 7/2002 | Sinz et al. ...................... | 73/290 R |

(Continued)

OTHER PUBLICATIONS

PCT International Search Report for PCT Application No. PCT/EP2011/066849, dated Jan. 2, 2012, 3 pgs.

(Continued)

*Primary Examiner* — Peter Bythrow
(74) *Attorney, Agent, or Firm* — Westman, Champlin & Koehler, P.A.

(57) ABSTRACT

A guided wave radar level gauge system, comprising a transmission line probe configured to support a first propagation mode such that it travels along the transmission line probe with a first propagation velocity exhibiting a first dependence on a dielectric constant of the surrounding medium, and support a second propagation mode such that it travels along the transmission line probe with a second propagation velocity exhibiting a second dependence, different from the first dependence, on the dielectric constant of the surrounding medium. The guided wave radar level gauge system further comprises processing circuitry connected to the transceiver for determining the filling level based on the reflected electromagnetic signal in the first propagation mode and the second propagation mode, and a known relation between the first dependence and the second dependence on the dielectric constant of the surrounding medium. Hereby, a filling level determination that is independent of the dielectric constant of the medium surrounding the transmission line probe can be achieved.

15 Claims, 5 Drawing Sheets

(56) References Cited

U.S. PATENT DOCUMENTS

| | | | | |
|---|---|---|---|---|
| 6,499,346 B1* | 12/2002 | Wien et al. | ............... | 73/290 R |
| 6,915,689 B2* | 7/2005 | Edvardsson | ............... | 73/290 V |
| 6,922,150 B2* | 7/2005 | Håll et al. | ............... | 340/612 |
| 6,987,481 B2* | 1/2006 | Fehrenbach et al. | ............... | 342/124 |
| 7,265,558 B1* | 9/2007 | Penndal et al. | ............... | 324/637 |
| 7,345,622 B2* | 3/2008 | Edvardsson | ............... | 342/124 |
| 7,525,476 B1* | 4/2009 | Delin et al. | ............... | 342/124 |
| 2003/0222654 A1* | 12/2003 | Furse et al. | ............... | 324/543 |
| 2004/0056667 A1* | 3/2004 | Lutke et al. | ............... | 324/644 |
| 2004/0099058 A1* | 5/2004 | Edvardsson | ............... | 73/290 V |
| 2004/0145510 A1* | 7/2004 | Edvardsson | ............... | 342/5 |
| 2004/0173020 A1* | 9/2004 | Edvardsson | ............... | 73/290 V |
| 2005/0184920 A1* | 8/2005 | Mahler et al. | ............... | 343/772 |
| 2007/0085729 A1* | 4/2007 | Edvardsson | ............... | 342/124 |
| 2007/0090992 A1* | 4/2007 | Edvardsson | ............... | 342/124 |
| 2009/0085794 A1* | 4/2009 | Edvardsson et al. | ............... | 342/124 |
| 2009/0303106 A1* | 12/2009 | Edvardsson | ............... | 342/124 |
| 2012/0169527 A1* | 7/2012 | Edvardsson | ............... | 342/124 |
| 2012/0169528 A1* | 7/2012 | Edvardsson et al. | ............... | 342/124 |
| 2012/0274500 A1* | 11/2012 | Nyberg | ............... | 342/124 |

OTHER PUBLICATIONS

Written Opinion of the International Searching Authority for PCT Application No. PCT/EP2011/066849, dated Jan. 2, 2012, 6 pgs.

* cited by examiner

GUIDED WAVE RADAR LEVEL GAUGE SYSTEM WITH DIELECTRIC CONSTANT COMPENSATION THROUGH MULTI-MODE PROPAGATION

TECHNICAL FIELD OF THE INVENTION

The present invention relates to a guided wave radar level gauge system and to a method of determining a filling level in a tank.

TECHNICAL BACKGROUND

Radar level gauge systems are in wide use for measuring process variables of products contained in tanks, such as filling level, temperature, pressure etc. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a transmission line probe. The transmission line probe is generally arranged vertically from top to bottom of the tank. The electromagnetic signals are subsequently reflected at the surface of the product, and the reflected signals are received by a receiver or transceiver comprised in the radar level gauge system. Based on the transmitted and reflected signals, the distance to the surface of the product can be determined.

More particularly, the distance to the surface of the product is generally determined based on the time between transmission of an electromagnetic signal and receipt of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity along the probe of the electromagnetic signals.

This propagation velocity is influenced by various factors, such as the configuration of the transmission line probe and environmental conditions inside the tank. Such environmental conditions, for example, include the composition of the atmosphere above the surface of the product contained in the tank, and product residue which may have adhered to the probe as the filling level of the product changes inside the tank.

In boiler applications, for example, the atmosphere inside the boiler tank may be steam under high pressure, in which case the difference in dielectric constant may be quite large for different operating conditions.

U.S. Pat. No. 7,525,476 discloses a guided wave radar level gauge system in which reference reflectors are provided at known positions along the transmission line probe and in which the difference between the measured distance and the known distance between a pair of reference reflectors is used to compensate for variations in propagation velocity caused by variations in the propagation conditions along the transmission line probe.

Although allowing for a more accurate filling level determination in applications with varying propagation properties inside the tank, the reference reflectors reflect a portion of the signal, which means that there is some reduction in the sensitivity of the radar level gauge system as compared to a corresponding guided wave radar level gauge system without reference reflectors.

SUMMARY OF THE INVENTION

In view of the above, it would be desirable to provide a guided wave radar level gauge system in which accurate filling level determination can be achieved in applications with varying propagation properties without the need for providing reference reflectors along the transmission line probe.

According to a first aspect of the present invention, it is therefore provided a guided wave radar level gauge system, for determination of a filling level of a product contained in a tank, the guided wave radar level gauge system comprising a transceiver for generating, transmitting and receiving electromagnetic signals; a transmission line probe arranged and configured to guide a transmitted electromagnetic signal from the transceiver in at least a first propagation mode and a second propagation mode through a surrounding medium towards the product inside the tank, and to return a reflected electromagnetic signal resulting from reflection of the electromagnetic signal by a surface of the product back towards the transceiver in the first propagation mode and the second propagation mode, the transmission line probe being configured to support the first propagation mode such that it travels along the transmission line probe with a first propagation velocity exhibiting a first dependence on a dielectric constant of the surrounding medium, and support the second propagation mode such that it travels along the transmission line probe with a second propagation velocity exhibiting a second dependence, different from the first dependence, on the dielectric constant of the surrounding medium; and processing circuitry connected to the transceiver for determining the filling level based on the reflected electromagnetic signal in the first propagation mode and the second propagation mode, and a known relation between the first dependence and the second dependence on the dielectric constant of the surrounding medium.

The "transceiver" may be one functional unit capable of transmitting and receiving electromagnetic signals, or may be a system comprising separate transmitter and receiver units.

The known relation between the first dependence and the second dependence may, for example, be the ratio between the first dependence and the second dependence, or, in other words, the dependence of the ratio between the first propagation velocity and the second propagation velocity on the dielectric constant of the surrounding medium.

The tank may be any container or vessel capable of containing a product, and may be metallic, or partly or completely non-metallic, open, semi-open, or closed.

The use of different propagation modes in non-contact radar level gauge system has previously been proposed for achieving a higher measurement accuracy. For example U.S. Pat. Nos. 6,915,689 and 7,345,622 describe radar level gauge systems where two TEM-modes with different propagation properties are emitted by an antenna and transmitted through a tubular waveguide. This has, however, so far not been believed to be possible for a transmission line probe.

The present inventors have now surprisingly found that it is indeed possible to configure a transmission line probe to support different propagation modes in such a way that the different propagation modes are influenced differently by changes in the dielectric constant of the medium surrounding the transmission line probe. Hereby, a filling level determination that is independent of the dielectric constant of the medium surrounding the transmission line probe can be achieved.

As a consequence, the effect of probe contamination on the propagation velocity of the electromagnetic signals, in addition to the effect of the presence of vapor above the surface, can be compensated for even in cases when the probe contamination and/or the presence of vapor above the surface would result in a non-uniform change of the propagation velocity.

Accordingly, the guided wave radar level gauge system according to various embodiments of the present invention provides for accurate filling level measurement even in cases when the atmosphere in the tank has an unknown and possibly non-uniform dielectric constant, and the transmission line probe has an unknown amount of tank content adhering to it.

The dependence of the propagation velocities of the different modes on the dielectric constant of the surrounding medium may, for example, be empirically determined. Depending on the actual configuration of the transmission line probe, it may also be feasible to determine an equation specifying the propagation velocity as a function of the dielectric constant of the surrounding medium.

The different propagation modes may, for example, be transverse electromagnetic (TEM) modes and/or modes propagating along the surface of the probe, herein referred to as surface waveguide (SWG) modes. For different configurations of the transmission line probe, different combinations of TEM-modes and SWG-modes may be advantageous.

According to various embodiments of the guided wave radar level gauge system according to the present invention, the transmission line probe may comprise at least two probe conductors and a dielectric enclosing structure at least partly enclosing at least one of said probe conductors. Examples of such transmission line probes are described in detail in US 2007/0090992, which is hereby incorporated by reference in its entirety.

The dielectric enclosing structure may advantageously extend along a substantial portion of the transmission line probe, such as along the entire length of the transmission line probe arranged inside the tank.

This type of the transmission line probe will in the following be referred to as a Partially External Dielectric (PED) transmission line probe.

The propagation velocity along the PED transmission line probe is characterized by an effective dielectric constant $\epsilon_{\mathit{eff}}$ which depends on the dielectric constant of the dielectric enclosing structure $\epsilon_{int}$ and the dielectric constant of the surrounding medium (air, steam, product vapor, probe contamination etc) $\epsilon_{ext}$. The propagation velocity of the electromagnetic signal travelling along the transmission line probe is given by the velocity of light divided by the square root of $\epsilon_{\mathit{eff}}$.

The effective dielectric constant $\epsilon_{\mathit{eff}}$ of the PED transmission line probe depends on the dielectric constant of the dielectric enclosing structure $\epsilon_{int}$ and the dielectric constant of the surrounding medium $\epsilon_{ext}$ according to the following relation:

$$\varepsilon_{\mathit{eff}} \sim \frac{1}{\dfrac{\alpha}{\epsilon_{ext}} + \dfrac{1-\alpha}{\varepsilon_{int}}}$$

where $\alpha$ is a number between 0 and 1 which indicates the degree of coupling to the surrounding medium. With $\alpha=1$, we have naked wires (and maximum influence of the surrounding medium) and with $\alpha=0$ we have a line fully screened from the surrounding medium (such as a closed coaxial line).

Since $\epsilon_{\mathit{eff}}$ determines the propagation velocity along the transmission line probe, the transmission line probe may advantageously be configured such that different propagation modes experience different values of $\alpha$. For example, the transmission line probe may be configured such that $\alpha$ and $\epsilon_{int}$ are uniform along the transmission line probe, but the determination of the dielectric constant $\epsilon_{ext}$ of the surrounding medium will be possible as long as any variations of $\alpha$ and $\epsilon_{int}$ are known.

By using a transmission line probe configured to support at least two propagation modes with different (and known) values of $\alpha$, the unknown dielectric constant $\epsilon_{ext}$ of the surrounding medium can be determined, which means that the filling level can be determined accurately without prior knowledge of the dielectric constant of the surrounding medium in the tank.

In some embodiments, the dielectric enclosing structure may be arranged symmetrically with respect to the at least two probe conductors.

In such embodiments, the radar level gauge system may advantageously comprise a feeding arrangement for feeding a TEM-mode and an SWG-mode to the transmission line probe, since such propagation modes will then exhibit propagation velocities having different dependencies on the dielectric constant of the surrounding medium (different values of $\alpha$).

In other embodiments, the dielectric enclosing structure may be arranged non-symmetrically with respect to the at least two probe conductors. In such embodiments, various different propagation modes with propagation velocities having different dependencies on the dielectric constant of the surrounding medium can be supported. For example, one TEM-mode and one SWG-mode, two different SWG-modes, or even two different SWG-modes and one TEM-mode can be supported. In embodiments where the transmission line probe comprises more than two probe conductors, two TEM-modes with different dependencies on the on the dielectric constant of the surrounding medium can be supported. This provides for electric fields that are more concentrated around the transmission line probe to decrease influence from tank structures close to the transmission line probe.

One way of arranging the dielectric enclosing structure non-symmetrically may be to arrange the dielectric enclosing structure around one of the conductor lines of the transmission line probe, and leaving another conductor line of the transmission line probe naked (without dielectric coating), or with only a very thin dielectric coating.

The different propagation modes may be fed to the transmission line probe using a feeding arrangement configured to create the first propagation mode and the second propagation mode, and to feed the first propagation mode and the second propagation mode to the transmission line probe.

According to various embodiments, the feeding arrangement may comprise a first input for receiving the transmitted electromagnetic signal from the transceiver; a second input for receiving the transmitted electromagnetic signal from the transceiver; and feeder circuitry connected to the first and second input and to the transmission line probe, the feeder circuitry being configured to: provide a first connection between the first input and the transmission line probe resulting in the first propagation mode; and provide a second connection between the second input and the transmission line probe resulting in the second propagation mode.

Using such a feeding arrangement, the reflected electromagnetic signal will be returned to the transceiver in the first propagation mode through the first input and in the second propagation mode through the second input.

This will allow separate further processing of the reflected signal in the first propagation mode and the second propagation mode.

Moreover, the transmission line probe may comprise at least two probe conductors, and the feeder circuitry may be configured in such a way that the first connection results in that the transmitted electromagnetic signal is provided to the at least two probe conductors in antiphase (currents flow in the at least two probe conductors in antiphase), and the second connection results in that the transmitted electromagnetic signal is provided to the at least two probe conductors in phase (currents flow in the at least two probe conductors in phase).

The feeding arrangement may, for example, comprise a microwave hybrid circuit, such as a so-called balun. Such a feeding arrangement may, for example, comprise a hybrid ring or a coil-based circuit, or any other suitable microwave hybrid circuit known to those skilled in the art. A coil-based feeding arrangement may, for example, be realized using a suitable transformer having a primary winding and a secondary winding.

In the latter case, the first input may be provided across the primary winding, and the second input may be provided between a reference voltage and a mid-point of the secondary winding.

In embodiments where the feeder circuitry comprises a microwave circuit, the microwave circuit may be configured in such a way that there is a first difference in propagation distance for the transmitted electromagnetic signal from the first input to the a first one of the probe conductors and a second one of the probe conductors, and there is a second difference in propagation distance, different from the first difference, for the transmitted electromagnetic signal from the second input to the a first one of the probe conductors and a second one of the probe conductors.

For example, the first difference may be approximately a half center wavelength of the transmitted electromagnetic signal, and the second difference may be approximately zero.

For some configurations of the transmission line probe, different propagation modes may occur spontaneously. In this case, no particular feeding arrangement is required, and the different propagation modes may be detected separately due to the difference in arrival time brought about by the difference in propagation velocity between the different propagation modes. To be able to distinguish the different propagation modes in this case, it is advantageous if the difference in propagation velocity between the different propagation modes is relatively large.

One way of achieving such a large difference in propagation velocity may be to provide a transmission line probe comprising a first supporting probe conductor and a second probe conductor wound around the first supporting probe conductor.

In particular for applications where it is desirable to be able to compensate for varying propagation conditions inside the tank also over short measurement distances (such as in boiler applications etc), it may, however, be advantageous if the guided wave radar level gauge system comprises a feeding arrangement configured to create the first propagation mode and the second propagation mode, and to feed the first propagation mode and the second propagation mode to the transmission line probe.

Since the different propagation modes can then be treated separately, the difference in propagation velocity and/or the distance to the surface need not be very large.

According to one embodiment, the transmission line probe may comprise a pair of insulated wires; and the guided wave radar level gauge system may comprise a feeding arrangement for feeding the transmitted electromagnetic signal to the pair of insulated wires in phase as a SWG-mode, and in anti-phase as a TEM-mode.

According to a second aspect of the present invention, it is provided a method of determining a filling level of a product contained in a tank, comprising the steps of: feeding a transmitted electromagnetic signal to a transmission line probe such that said transmitted electromagnetic signal is guided by the transmission line probe towards a surface of the product in the tank in a first propagation mode having a first propagation velocity and a second propagation mode having a second propagation velocity; receiving a reflected electromagnetic signal in said first propagation mode and said second propagation mode, said reflected electromagnetic signal resulting from reflection of said transmitted electromagnetic signal at said surface of the product in the tank; and determining said filling level based on a time-of-flight of said first propagation mode of the reflected electromagnetic signal and a difference in time-of-flight of said first propagation mode and said second propagation mode of the reflected electromagnetic signal.

Further embodiments of, and effects obtained through this second aspect of the present invention are largely analogous to those described above for the first aspect of the invention.

BRIEF DESCRIPTION OF THE DRAWINGS

These and other aspects of the present invention will now be described in more detail, with reference to the appended drawings showing example embodiments of the invention, wherein:

FIG. 1b is a schematic illustration of the measurement electronics unit comprised in the guided wave radar level gauge system in FIG. 1a;

DETAILED DESCRIPTION OF AN EXAMPLE EMBODIMENT OF THE INVENTION

In the present detailed description, various embodiments of the radar level gauge system according to the present invention are mainly discussed with reference to a guided wave radar (GWR) level gauge system utilizing a partially external dielectric (PED) transmission line probe with two conductor lines extending in parallel to each other from the ceiling of the tank towards and into the product contained in the tank. It should be noted that this by no means limits the scope of the present invention, which is equally applicable to various other kinds of transmission line probes, such as transmission line probes with more than two conductor lines, transmission line probes with conductor lines that do not extend in parallel with each other, etc. For example, a first conductor line may extend along a straight line, and a second conductor line may be wound around the first conductor line. The extra inductance decreases the velocity for one of the modes without decreasing the wave velocity such as a tighter capacitive coupling would do so the arrangement would make it easier to separate the two echoes.

Furthermore, reference is mainly made to filling level determination by means of measuring the time between transmitted and reflected pulses. As is, however, evident to the person skilled in the relevant art, the teachings of the present invention are equally applicable to radar level gauge systems utilizing phase information for determining the filling level through, for example, frequency-modulated continuous wave (FMCW) measurements. When pulses modulated on a carrier are used, phase information can also be utilized.

Figure 1A:
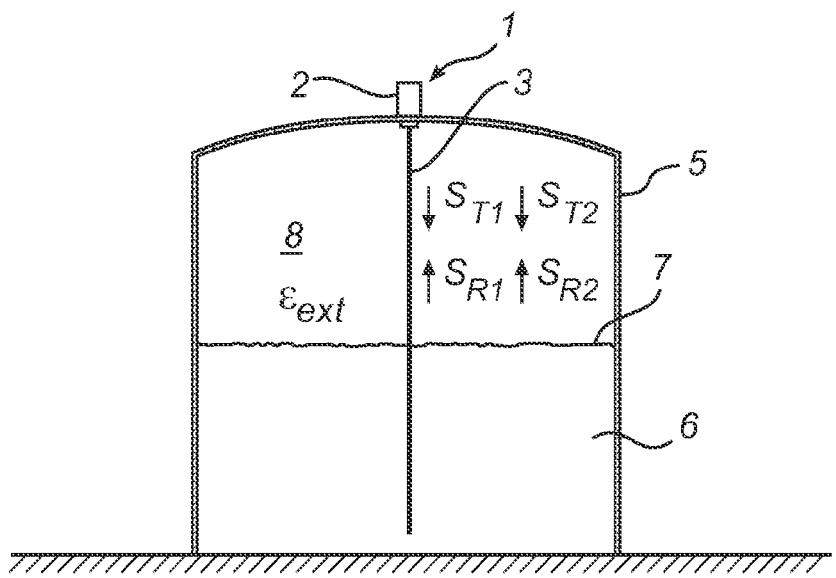
FIG. 1a schematically illustrates a guided wave radar level gauge system according to an embodiment of the present invention installed in an exemplary tank.

FIG. 1a schematically illustrates a radar level gauge system 1 according to an embodiment of the present invention, comprising a measurement electronics unit 2, and a transmission line probe 3. The radar level gauge system 1 is provided on a tank 5, which is partly filled with a product 6 to be gauged. By guiding a transmitted electromagnetic signal in a first propagation mode $S_{T1}$ and a second propagation mode $S_{T2}$ towards the surface 7 of the product 6, and analyzing reflected signals in the first propagation mode $S_{R1}$ and the second propagation mode $S_{R2}$ traveling back from the surface 7, the measurement electronics unit 2 can determine the distance between a reference position (such as the tank ceiling) and the surface 7 of the product 6, whereby the filling level can be deduced even if the dielectric constant $\epsilon_{ext}$ of the medium 8 in the tank surrounding the transmission line probe 3 is unknown and/or varying. It should be noted that, although a tank 5 containing a single product 6 is discussed herein, the distance to any material interface along the probe can be measured in a similar manner.

Figure 1B:
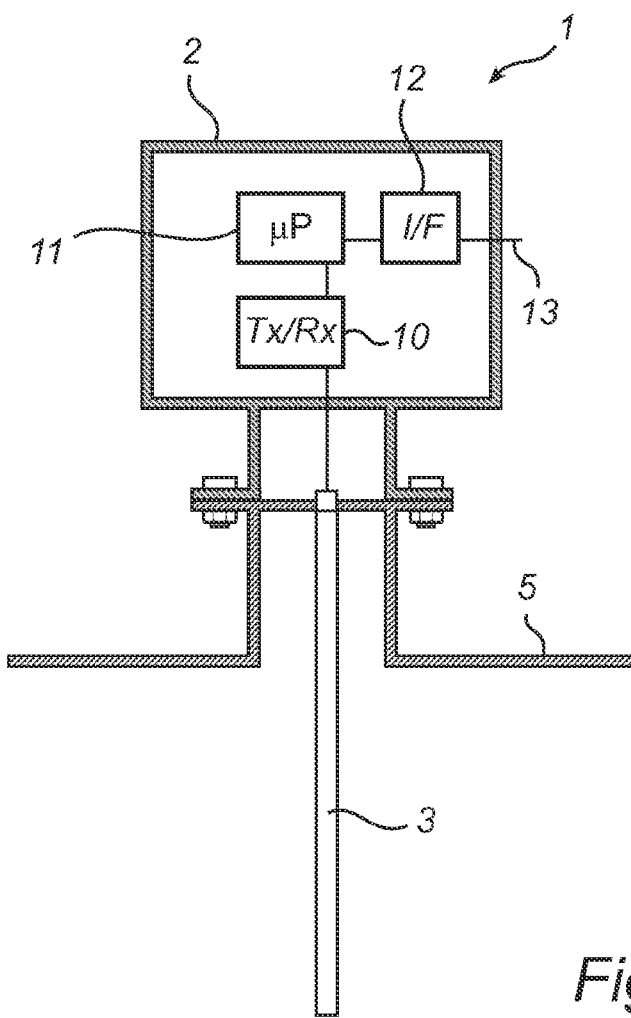

As is schematically illustrated in FIG. 1b, the electronics unit 2 comprises a transceiver 10 for transmitting and receiving electromagnetic signals, a processing unit 11, which is connected to the transceiver 10 for control of the transceiver and processing of signals received by the transceiver to determine the filling level of the product 6 in the tank 5. The processing unit 11 is, furthermore, connectable to external communication lines 13 for analog and/or digital communication via an interface 12. Moreover, although not shown in FIG. 1b, the guided wave radar level gauge system 1 is typically connectable to an external power source, or may be powered through the external communication lines 13. Alternatively, the radar level gauge system 1 may be configured to communicate wirelessly.

Figure 2A:
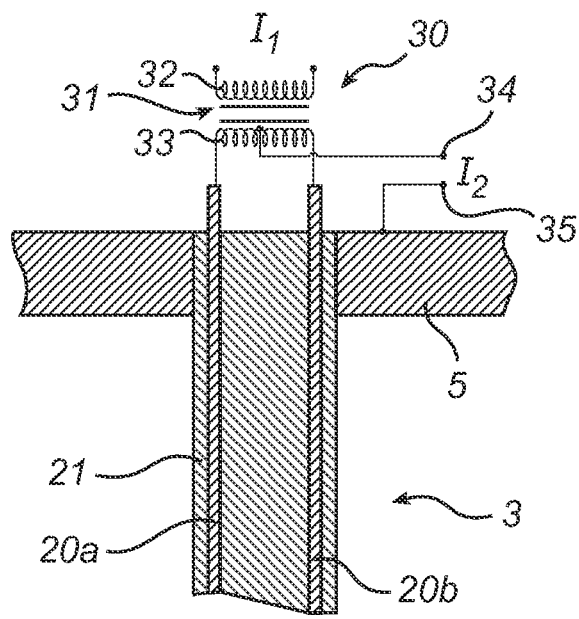
FIG. 2a schematically shows a first example of a feeding arrangement for creating and feeding two different propagation modes to the transmission line probe in FIGS. 1a-b.
Figure 2B:
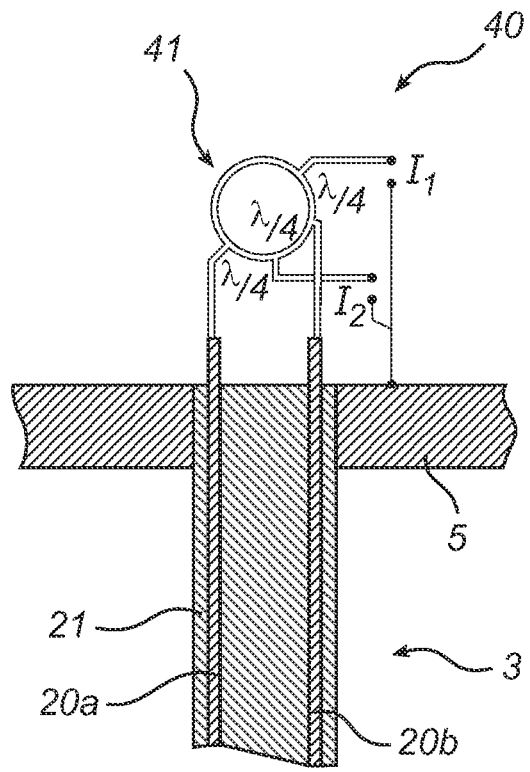
FIG. 2b schematically shows a second example of a feeding arrangement for creating and feeding two different propagation modes to the transmission line probe in FIGS. 1a-b.

FIGS. 2a-b schematically illustrate two examples of feeding arrangements for creating and feeding two different propagation modes to the transmission line probe 3 in FIGS. 1a-b.

Referring first to FIG. 2a, the transmission line probe 3 comprises a first probe conductor 20a, a second probe conductor 20b extending substantially in parallel with the first probe conductor 20a, and an enclosing dielectric structure 21 surrounding the first 20a and second 20b probe conductors. As is indicated schematically in FIG. 2a, the guided wave radar level gauge system 1 further comprises a feeding arrangement 30 for creating and feeding the first propagation mode $S_{T1}$ and the second propagation mode $S_{T2}$ to the transmission line probe 3.

The feeding arrangement 30 comprises a transformer 31 with a primary winding 32 and a secondary winding 33. The secondary winding 33 is connected between the first probe conductor 20a and the second probe conductor 20b. To allow feeding of the transmitted electromagnetic signal $S_T$ to the transmission line probe 3, the feeding arrangement 30 further comprises a first input $I_1$ across the primary winding 32 and a second input $I_2$ with one terminal 34 connected in the middle of the secondary winding 33 and another terminal connected to the tank wall 5 in the vicinity of the transmission line probe 3. Such a transformer connection is commercially available in the most common frequency range 100-1000 MHz used by GWRs. A small ferrite core is typically used in the transformer.

By providing the transmitted signal $S_T$ to the first input $I_1$ and the second input $I_2$, two different propagation modes $S_{T1}$ and $S_{T2}$ are created and fed to the transmission line probe 3. The signal at the first input $I_1$ will be provided to the first 20a and second 20b probe conductors in anti-phase or opposite phase and will propagate along the transmission line probe 3 as a TEM-mode $S_{T1}$. The signal at the second input $I_2$ will be provided to the first 20a and second 20b probe conductors in phase and will propagate along the transmission line probe 3 as a SWG-mode $S_{T2}$.

Turning now to FIG. 2b, a feeding arrangement 40 is schematically shown, which comprises a so-called hybrid ring 41. As indicated in FIG. 3b, the connections of the ring are separated from each other a distance corresponding to a quarter wavelength ($\lambda/4$) of the transmitted signal. As is well known to those skilled in the art of microwave circuits, the dimensioning of the hybrid ring 41 provides for the creation and feeding of two different propagation modes $S_{T1}$ and $S_{T2}$. Again, the signal at the first input $I_1$ will be provided to the first 20a and second 20b probe conductors in anti-phase or opposite phase and will propagate along the transmission line probe 3 as a TEM-mode $S_{T1}$. The signal at the second input $I_2$ will be provided to the first 20a and second 20b probe conductors in phase and will propagate along the transmission line probe 3 as a SWG-mode $S_{T2}$.

The hybrid ring 41 may advantageously be provided as a strip line on a circuit board.

Through a suitable configuration of the transmission line probe 3, the first $S_{T1}$ and second $S_{T2}$ propagation modes will have propagation velocities that depend on the dielectric constant of $\epsilon_{ext}$ the surrounding medium 8 according to different known relations. Based on the time-of-flight of one of the propagation modes, the difference in time-of-flight of the propagations modes and the known different relations between the propagation velocities of the propagation modes and the dielectric constant of the surrounding medium 8, an accurate filling level value can be determined without knowledge (or assumptions) about the dielectric constant $\epsilon_{eff}$ of the surrounding medium 8.

As is mentioned above in the Summary section, the effective dielectric constant $\epsilon_{eff}$ of the transmission line probe 3 depends on the dielectric constant of the dielectric enclosing structure $\epsilon_{int}$ and the dielectric constant $\epsilon_{ext}$ of the surrounding medium 8 according to the following relation:

$$\varepsilon_{eff} \sim \frac{1}{\dfrac{\alpha}{\epsilon_{ext}} + \dfrac{1-\alpha}{\varepsilon_{int}}}$$

where $\alpha$ is a number between 0 and 1 which indicates the degree of coupling to the surrounding medium. Moreover, the propagation velocity is inversely proportional to the square root of the effective dielectric constant $\in_{\mathit{eff}}$.

Figure 3:
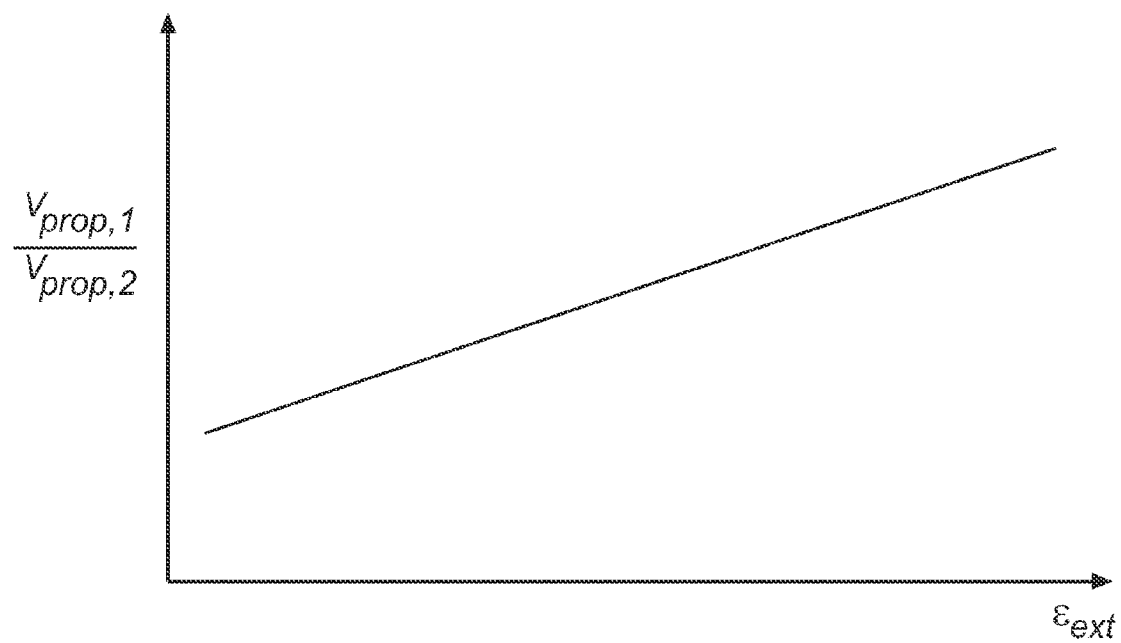
FIG. 3 is a diagram schematically illustrating the ratio between the propagation velocities for two different propagation modes having different insulation factors α as a function of the dielectric constant of the surrounding medium.

To illustrate the resulting dependence of the propagation velocity on the dielectric constant $\in_{\mathit{ext}}$ of the surrounding medium 8, a diagram with the ratio between the propagation velocities for two different propagation modes having different insulation factors α as a function of the dielectric constant $\in_{\mathit{ext}}$ of the surrounding medium 8 is provided in FIG. 3. For the exemplary case illustrated in FIG. 3, the insulation factor $\alpha_1$ for the first propagation mode $S_{T1}$ (the TEM-mode) is 0.5, and the insulation factor $\alpha_2$ for the second propagation mode $S_{T2}$ (the SWG-mode) is 0.75.

Many different transmission line probe configurations can be used to achieve the desired different dependence of propagation velocity on dielectric constant of the surrounding medium for the different propagation modes. Some examples of such transmission line probe configurations will be described below with reference to FIGS. 4a-f schematically showing cross-sectional views of various transmission line probes.

Figure 4A:
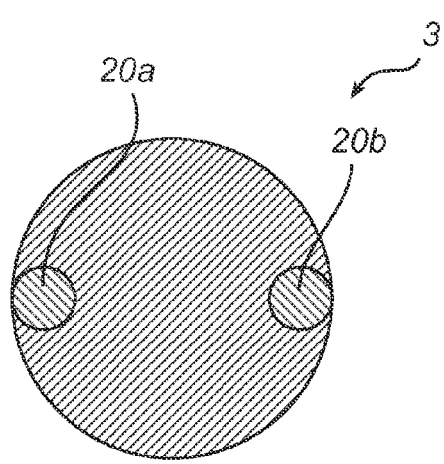
FIGS. 4a-f schematically illustrate various transmission line probes for use in the guided wave radar level gauge system according to embodiments of the present invention.

FIG. 4a is a radial cross-section view of a first embodiment of the transmission line probe 3 in FIG. 1a. In this embodiment, the probe conductors 20a-b are embedded in a dielectric enclosing structure 21.

Figure 4B:
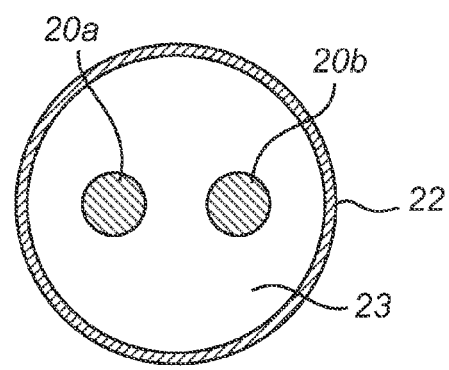

FIG. 4b is a radial cross-section view of another embodiment of the transmission line probe 3. In this embodiment, the probe conductors 20a-b are positioned inside a dielectric enclosing structure in the form of a plastic tube 22, serving as an outer structural enclosure of the probe conductors 20a-b. The volume 23 between the inner surface of the structure enclosing tube 22 can either consist of a gas, such as air, or be at least partly filled by a solid or liquid dielectric filling material. In the case where the volume 23 is filled with a solid dielectric filling material, it may advantageously be selected from crystalline and/or amorphous materials, such as a ceramic or glass.

Figure 4C:
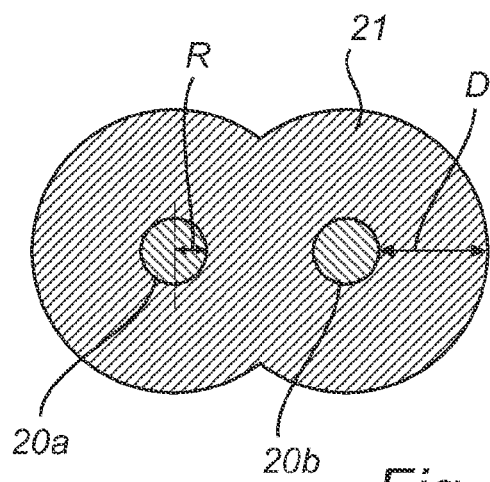

FIG. 4c is also a radial cross-section view of a further embodiment of the transmission line probe 3. In this embodiment, the distance D, from the outer surface of the dielectrically enclosed transmission line probe 3 to the outer surface of each of the parallel probe conductors 20a-b, is equal at any point around the outer surface of the dielectrically enclosed transmission line probe 3. This embodiment provides for a transmission line probe 3 where the effective dielectric constant can be determined relatively easily as the influence of the surrounding medium will be equal at any point around the outer surface of the dielectrically enclosed transmission line probe 3.

So far, various exemplary transmission line probes of the twin-line type with a symmetrically arranged dielectric enclosing structure have been discussed. Although the dielectric enclosing structure is symmetrically arranged, the desired difference in the behavior of different propagation modes can be achieved. By, for example, feeding the transmission line probe with a TEM-mode and an SWG-mode, a substantial difference in coupling to the surrounding medium 8 can be achieved (different α), so that the propagation velocity of the different propagation modes exhibit different dependences on the dielectric constant $\in_{\mathit{ext}}$ of the surrounding medium 8.

However, this desired difference in propagation velocity dependence on the dielectric constant $\in_{\mathit{ext}}$ of the surrounding medium 8 for different propagation modes may also be achieved for, for example, two different SWG-modes if the dielectric enclosing structure 21 is non-symmetrically arranged.

Figure 4D:
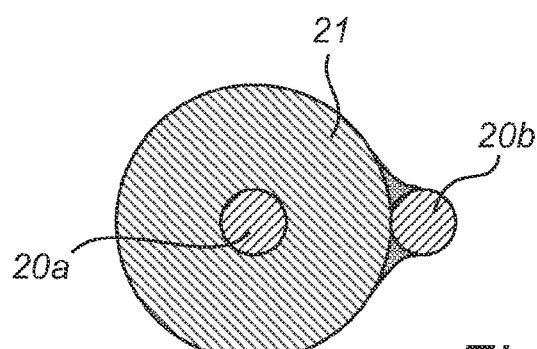

An example of a transmission line probe 3 with a non-symmetrically arranged dielectric enclosing structure 21 is schematically shown in FIG. 4d, where one probe conductor 20a is embedded in a relatively thick layer of dielectric material, while the other probe conductor 20b is a naked conductor. Of course, the other probe conductor 20b may alternatively be embedded in a thin layer of dielectric material.

Although having different configurations of the dielectric enclosing structure 21, all of the exemplary transmission line probes described with reference to FIGS. 3a-d comprise two substantially identical probe conductors 20a-b that extend substantially in parallel. As an alternative, at least in some applications, the probe conductors may be different, and one of the probe conductors may even be constituted by the tank wall (in the case of a conductive tank) or another conducting structure arranged sufficiently close to the first probe conductor.

Figure 4E:
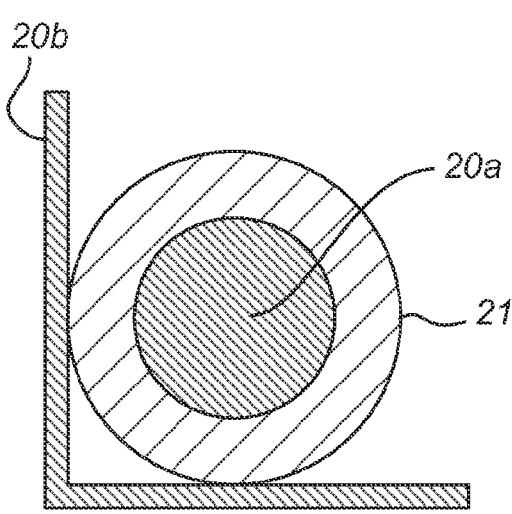

In FIG. 4e, a first probe conductor 20a is covered by a dielectric enclosing structure 21. The insulated first probe conductor 20a is arranged adjacent to a metallic structure, as an example, an angle bar. In this case, the angle bar serves as the second probe conductor 20b. In another case, the wall of the tank can serve as the second probe conductor 20b instead of the angle bar.

Figure 4F:
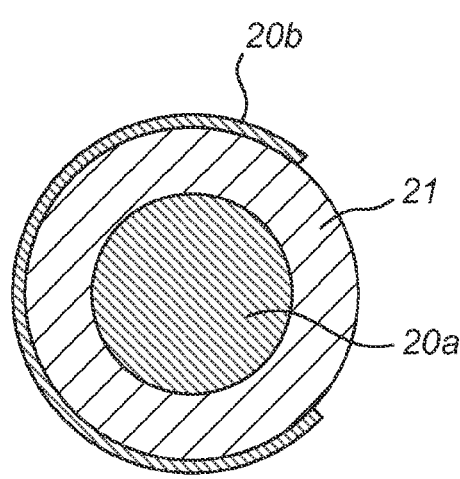

In a similar manner, FIG. 4f illustrates a transmission line probe with the first probe conductor 20a being covered by a insulating material 21. A metallic covering encloses approximately 60 to 80% of the first probe conductor 20a and functions as the second probe conductor 20b.

Figure 5:
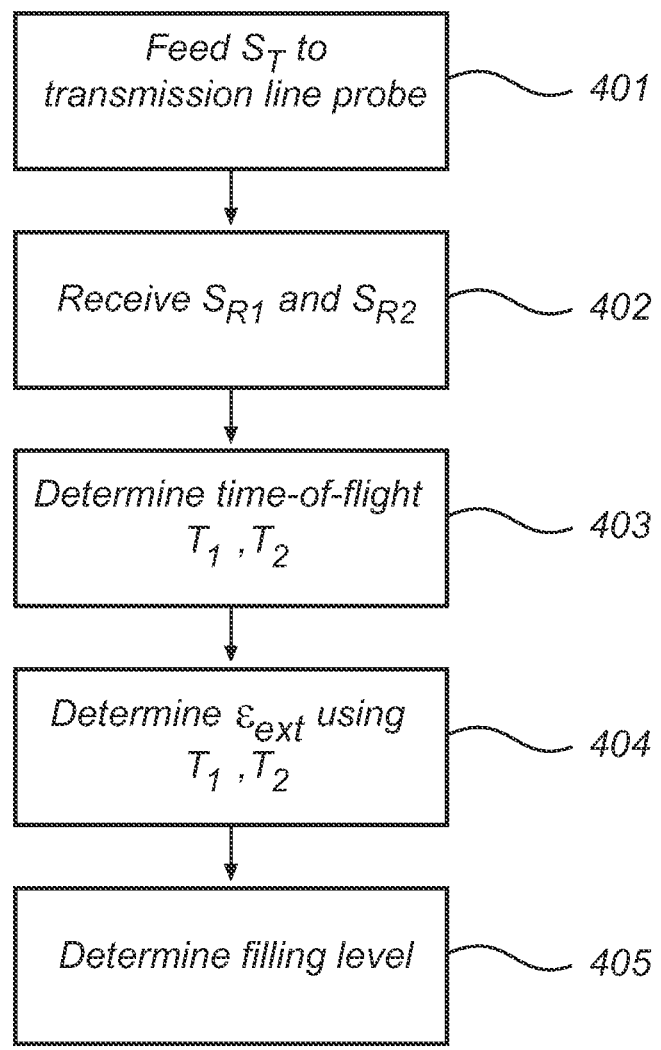
FIG. 5 is a flow-chart schematically illustrating an example embodiment of the method according to the present invention.

An example embodiment of the filling level determination method according to embodiments of the present invention will now be described with reference to the flow chart in FIG. 5 as well as to FIGS. 1 a-b.

In a first step 401, a transmitted electromagnetic signal $S_T$ is fed to a transmission line probe 3 that is configured to support at least a first propagation mode $S_{T1}$ and a second propagation mode $S_{T2}$ in such a way that two conditions are fulfilled:

The first $S_{T1}$ and second $S_{T2}$ propagation modes travel along the transmission line probe 3 with first $V_{\mathit{prop1}}$ and second $v_{\mathit{prop2}}$ propagation velocities that exhibit different dependencies on the dielectric constant $\in_{\mathit{ext}}$ of the surrounding medium 8 (different α).

The first $S_{T1}$ and second $S_{T2}$ propagation modes exhibit sufficient coupling to the dielectric constant $\in_{\mathit{ext}}$ of the surrounding medium 8 to be reflected at the surface 7 of the product 6 (sufficiently large α).

Various examples of transmission line probes that fulfill the above conditions for suitably selected propagation modes have been described above with reference to FIGS. 3a-f.

In a second step 402, a reflected electromagnetic signal $S_R$ resulting from reflection of the transmitted electromagnetic signal $S_T$ at the surface 7 of the product 6 is received in the two propagation modes $S_{R1}$ and $S_{R2}$.

Subsequently, in step 403, the time-of-flight (or a value indicative of the time-of-flight) T1 of the first propagation mode and the time-of-flight T2 of the second propagation mode are determined.

In the next step 404, the dielectric constant $\in_{\mathit{ext}}$ of the surrounding medium 8 is determined using the time-of-flight values T1, T2 determined in step 403 and the known relation between the time-of-flight and the dielectric constant $\in_{\mathit{ext}}$ of the surrounding medium 8 for the two propagation modes:

$$\varepsilon_{\mathit{eff}} \sim \frac{1}{\frac{\alpha}{\epsilon_{ext}} + \frac{1-\alpha}{\varepsilon_{int}}}$$

Since the propagation velocity $v_{prop}$ is determined by the following relation:

$$v_{prop} = \frac{v_0}{\sqrt{\varepsilon_{\mathit{eff}}}},$$

where $v_0$ is the propagation velocity of electromagnetic signals along the probe in vacuum, the time-of-flight is proportional to $\sqrt{\in_{\mathit{eff}}}$.

Once the dielectric constant $\in_{ext}$ of the surrounding medium 8 has been determined, the effective dielectric constant $\in_{\mathit{eff}}$ can be determined, after which a DC-corrected (dielectric constant corrected) distance to the surface 7 of the product 6 is determined in step 405.

In order to use the method according to various embodiments of the present invention, the relationship between the propagation velocity (or time-of-flight) and the dielectric constant $\in_{ext}$ of the surrounding medium 8 should be known. This relationship can, for example, be determined by simulations based on the configuration of the transmission line probe 3 (materials, dimensions etc) and/or measurements, and may be embodied as a mathematical formula or as a lookup table, or a combination of those. Such simulations and/or measurements will be well within the reach of those skilled in the art to carry out without undue burden.

The person skilled in the art realizes that the present invention by no means is limited to the preferred embodiments described above. For example, other feeding arrangements may be used, which may be based on other suitable microwave hybrid circuits available to those skilled in the art. Moreover, various other transmission line probes may be used, which may have more than two probe conductors.

What is claimed is:

1. A guided wave radar level gauge system, for determination of a filling level of a product contained in a tank, said guided wave radar level gauge system comprising:
    a transceiver for generating, transmitting and receiving electromagnetic signals;
    a transmission line probe comprising at least two probe conductors extending from a ceiling of the tank towards and into the product in the tank, said transmission line probe being arranged and configured to guide a transmitted electromagnetic signal from said transceiver in at least a first propagation mode and a second propagation mode through a surrounding medium towards and into said product inside the tank, and to return a reflected electromagnetic signal resulting from reflection of said electromagnetic signal by a surface of said product back towards said transceiver in said first propagation mode and said second propagation mode,
    the transmission line probe being configured to support said first propagation mode such that it travels along the transmission line probe with a first propagation velocity exhibiting a first dependence on a dielectric constant of the surrounding medium, and support said second propagation mode such that it travels along the transmission line probe with a second propagation velocity exhibiting a second dependence, different from the first dependence, on said dielectric constant of the surrounding medium; and
    processing circuitry connected to the transceiver for determining the filling level based on said reflected electromagnetic signal in said first propagation mode and said second propagation mode, and a known relation between said first dependence and said second dependence on said dielectric constant of the surrounding medium.

2. The guided wave radar level gauge system according to claim 1, wherein said transmission line probe further comprises a dielectric enclosing structure at least partly enclosing at least one of said probe conductors.

3. The guided wave radar level gauge system according to claim 2, wherein said dielectric enclosing structure is arranged symmetrically with respect to said at least two probe conductors.

4. The guided wave radar level gauge system according to claim 2, wherein said dielectric enclosing structure is arranged non-symmetrically with respect to said at least two probe conductors.

5. The guided wave radar level gauge system according to claim 1, wherein at least one of said first and second propagation modes is a surface waveguide (SWG) mode.

6. The guided wave radar level gauge system according to claim 1, wherein at least one of said first and second propagation modes is a transversal electromagnetic wave (TEM) mode.

7. The guided wave radar level gauge system according to claim 1, wherein said transmission line probe comprises a first supporting probe conductor and a second probe conductor wound around the first supporting probe conductor.

8. The guided wave radar level gauge system according to claim 1, further comprising a feeding arrangement connected between said transceiver and said transmission line probe and configured to create the first propagation mode and the second propagation mode, and to feed the first propagation mode and the second propagation mode to the transmission line probe.

9. The guided wave radar level gauge system according to claim 8, wherein said feeding arrangement comprises:
    a first input for receiving the transmitted electromagnetic signal from the transceiver;
    a second input for receiving the transmitted electromagnetic signal from the transceiver; and
    feeder circuitry connected to the first and second input and to the transmission line probe,
    said feeder circuitry being configured to:
    provide a first connection between the first input and the transmission line probe resulting in the first propagation mode; and
    provide a second connection between the second input and the transmission line probe resulting in the second propagation mode.

10. The guided wave radar level gauge system according to claim 9, wherein said transmission line probe comprises at least two probe conductors, and wherein said feeder circuitry is configured in such a way that:
    said first connection results in that the transmitted electromagnetic signal is provided to said at least two probe conductors in antiphase; and
    said second connection results in that the transmitted electromagnetic signal is provided to said at least two probe conductors in phase.

11. The guided wave radar level gauge system according to claim 9, wherein said feeder circuitry comprises a transformer having a primary winding and a secondary winding.

12. The guided wave radar level gauge system according to claim 11, wherein said first input is provided across said primary winding, and said second input is provided between a reference voltage and a mid-point of said secondary winding.

13. The guided wave radar level gauge system according to claim 9, wherein said feeder circuitry comprises a microwave circuit configured in such a way that:
there is a first difference in propagation distance for said transmitted electromagnetic signal from the first input to the a first one of said probe conductors and a second one of said probe conductors; and
there is a second difference in propagation distance, different from said first difference, for said transmitted electromagnetic signal from the second input to the a first one of said probe conductors and a second one of said probe conductors.

14. The guided wave radar level gauge system according to claim 13, wherein said first difference is approximately a half center wavelength of the transmitted electromagnetic signal, and the second difference is approximately zero.

15. A method of determining a filling level of a product contained in a tank using a guided wave radar level gauge system comprising a transceiver, a transmission line probe comprising at least two probe conductors extending from a ceiling of the tank towards and into the product in the tank, and processing circuitry, said method, comprising the steps of:
feeding a transmitted electromagnetic signal generated by said transceiver to the transmission line probe such that said transmitted electromagnetic signal is guided by the transmission line probe towards a surface of the product in the tank in a first propagation mode having a first propagation velocity and a second propagation mode having a second propagation velocity;
receiving by said transceiver a reflected electromagnetic signal in said first propagation mode and said second propagation mode, said reflected electromagnetic signal resulting from reflection of said transmitted electromagnetic signal at said surface of the product in the tank; and
determining, using said processing circuitry, said filling level based on a time-of-flight of said first propagation mode of the reflected electromagnetic signal and a difference in time-of-flight of said first propagation mode and said second propagation mode of the reflected electromagnetic signal.

* * * * *